US005375824A

United States Patent [19]

Anker et al.

[11] Patent Number: 5,375,824

[45] Date of Patent: Dec. 27, 1994

[54] SELECTABLE PIN SPACING ON GATHERING CHAIN

[75] Inventors: Earl Anker, Glenwood, Ill.; Robert Davis, Hickory, N.C.

[73] Assignee: R. R. Donnelley & Sons Company, Lisle, Ill.

[21] Appl. No.: 32,668

[22] Filed: Mar. 17, 1993

[51] Int. Cl.[5] .......................... B65H 5/34; B65G 47/31

[52] U.S. Cl. .......................................... 270/53; 271/203; 271/270; 198/461; 198/644

[58] Field of Search ................ 198/461, 644; 271/202, 271/203, 270, 275; 270/53, 54

[56] References Cited

U.S. PATENT DOCUMENTS

| | | | |
|---|---|---|---|
| 2,663,564 | 12/1953 | Meffert . | |
| 3,075,630 | 1/1963 | Fisk | 198/460 X |
| 3,423,900 | 1/1969 | Orsinger | 270/54 X |
| 3,827,545 | 8/1974 | Buhayar | 271/203 X |
| 4,184,392 | 1/1980 | Wood | 271/203 X |
| 4,506,873 | 3/1985 | Faltin | 271/270 X |
| 4,632,381 | 12/1986 | Cuir et al. | 271/270 |
| 4,682,684 | 7/1987 | Lothman | 198/461 |
| 4,767,487 | 8/1988 | Tomsovic, Jr. | 198/461 X |
| 4,768,770 | 9/1988 | Pessina et al. . | |
| 4,968,017 | 11/1990 | Depetris . | |
| 5,054,984 | 10/1991 | Chan et al. . | |
| 5,120,036 | 6/1992 | Simons | 270/54 X |

*Primary Examiner*—Edward K. Look
*Assistant Examiner*—John Ryznic
*Attorney, Agent, or Firm*—Wood, Phillips, VanSanten, Hoffman & Ertel

[57] ABSTRACT

A binding line having selectable pin spacing on a gathering chain includes a gathering section including the gathering chain having a plurality of spaced pusher pins for transporting gathered signatures seriatim therealong to a signature exit end. A stitcher section includes a stitcher chain having a plurality of spaced pusher pins for transporting signatures seriatim therealong from a signature entry end. A drive system provides for driving the gathering chain synchronously with the stitcher chain so that both the gathering section and stitcher section operate at a constant signature feed rate. The gathering chain pins are spaced apart a first select distance and the stitcher chain pins are spaced apart a second select distance, different from the first select distance. The drive system drives the gathering chain at a different velocity from the stitcher chain to provide the constant signature feed rate. A transfer section includes a fixed saddle plate extending between the gathering section exit end and the stitcher section entry end and an endless overhead chain having a plurality of spaced pusher pins. A belt drive system includes a timing belt extending between a drive pulley and a driven pulley. The drive pulley is operatively coupled to the first drive system and the driven pulley is operatively coupled to the overhead chain. An idler pulley and cam mechanism are each operatively associated with the timing belt. The cam mechanism cyclically, reciprocally moves the idler pulley generally toward and away from a center line of the driven pulley to pulse velocity of the driven pulley, and thus the overhead chain, approximately between the velocities of the gathering section and the stitcher section so that when a signature is delivered to the saddle plate from the gathering chain, one of the pusher pins begins pushing a signature at a velocity similar to velocity of the gathering chain and then rapidly varies velocity of the overhead chain, so that when a signature is delivered to the stitcher section from the saddle plate, the pusher pin is pushing the signature at a velocity similar to velocity of the stitcher chain.

20 Claims, 4 Drawing Sheets

SELECTABLE PIN SPACING ON GATHERING CHAIN

FIELD OF THE INVENTION

This invention relates to apparatus for gathering printed signatures to compose books and a transfer section for synchronously delivering composed books to a stitcher for binding of the books and, more particularly, to such apparatus which provides selectable pin spacing on a gathering chain.

BACKGROUND OF THE INVENTION

In a conventional binding line signatures to be included in a book are selected and gathered. In a binding line of one known form, a gathering section includes a gathering chain having a plurality of spaced pusher pins. One or more signature feeder stations are positioned above the gathering chain. The signature feeding stations are operated to feed a signature to the chain as it passes thereby. The timing of the signature feed coincides with each pusher pin approaching the feeder station. The signature comprises one or more sheets cut from a web and folded. The signatures straddle the chain at the fold line with the pusher pins bearing against a tail end of the signatures and forming the book as by a plurality of signatures being selectively deposited in sequence as the gathering chain moves beneath the feeding stations.

Once the signatures have been gathered, the book is transferred to a stitcher section. The stitcher section in one known form also includes a stitcher chain having a plurality of spaced pins for transporting signatures seriatim. Such a stitcher uses a two strand stitcher chain to allow stitcher clinchers to pass between the strands. The stitcher includes a flying stitcher head oscillating above the stitcher chain to drive staples through the gathered signatures at the fold line to secure the same.

In a binding line of the type described, the gathering chain and stitcher chain are synchronously operated. Both are driven in unison so that when a set of gathered signatures is delivered to an exit end of the gathering chain it can be suitably picked up at an entry end of the stitcher chain. An overhead transfer station transfers signatures from the gathering chain to the stitcher chain. The transfer station includes a fixed saddle plate extending between the gathering section exit end and the stitcher section entry end and an endless overhead chain having a plurality of spaced pusher pins. The overhead chain is also driven synchronously with the gathering chain and stitcher chain to provide continuous uninterrupted operation.

In design of a binding line, various parameters must be considered. These parameters include the ability to assemble books of different sizes and the ability to assemble the books without damaging the books.

A binding line as previously described usually includes pin spacing on the order of twenty-one inches on both the gathering chain and stitcher chain. Both the gathering chain and stitcher chain are driven by a common drive system. Indeed, a main drive shaft is used for driving all related equipment to provide synchronization, including operation of the signature feeders and the stitcher. With any given system the main drive will operate to provide a select cycle time. As is apparent, with twenty-one inch spacing the chain moves at twenty-one inches per cycle. With shorter pin spacing, for example fifteen inch pin spacing, the chain moves at a rate of fifteen inches per cycle. One advantage to using twenty-one inch spacing is that it allows for the line to be used with virtually any sized book. However, the higher rate of speed can damage the signatures as the pusher pins are moving at a higher rate of speed when they impact the tail end of the book as the signatures are gathered. The closer spacing, on the order of fifteen inches, provides a slower operating speed to lessen damage. However, such a system cannot handle all size books.

In view of the above, it is apparent that a need exists to obtain the benefits of longer and shorter pin spacing, i.e., have the ability to operate a relatively long pin spacing, on the order of twenty-one inches, while using a shorter pin spacing, on the order of fifteen inches, when possible to improve efficiency on a single binding line. Heretofore, all known binding lines of the type discussed above have operated both the gathering chain and stitcher chain to have the same pin spacing and operate at the same velocity.

The present invention is directed to solving one or more of the problems discussed above in a novel and simple manner.

SUMMARY OF THE INVENTION

In accordance with the invention, a binding line is provided which operates first and second binding line sections at different velocities and includes a transfer section which varies velocity of a transferring means between the velocities of the two sections.

Particularly, a binding line incorporating a stitcher with a fixed chain spacing can be operated with its preceding gathering machine capable of operation with its chain spacing equal to the stitcher or considerably shorter to enable higher productivity.

Broadly, there is disclosed herein a binding line comprising a first binding line section including means for transporting signatures seriatim therealong to a book exit end. A second binding line section includes means for transporting signatures seriatim therealong from a book entry end. A first drive means drives the first binding line section synchronously with the second binding line section so that both the first and second binding line sections operate at a constant signature feed rate. The first binding line section provides a different spacing between successive signatures than the second binding line section, so that the first drive means drives the first binding line section at a different velocity than the second binding line section. A transfer section includes means for transferring signatures seriatim from the first binding line section exit end to the second binding line section entry end. A second drive means is operatively coupled to the first drive means and the transfer section for driving the transferring means synchronously with the first and second binding line sections and including means for cyclically varying velocity of the transferring means approximately between the velocities of the first and second binding line sections.

It is a feature of the invention that the first drive means drives the first binding line section at a slower velocity than the second binding line section, and the second drive means varies velocity of the transferring means during a signature transfer cycle from a relatively slow speed to a relatively high speed.

It is another feature of the invention that the second drive means comprises a belt drive, the speed of the belt being varied synchronously with the first drive means.

It is another feature of the invention that the second drive means drives the transferring means at an average velocity substantially equal to velocity of the second binding line section.

It is a still further feature of the invention that the first and second binding line sections comprise a driven chain having pins spaced a select distance apart to determine spacing between successive signatures transported therealong.

It is yet another feature of the invention that the select distance for the first binding line section is less than the select distance for the second binding line section.

It is still yet a further feature of the invention that the first drive means drives the chain of the first section at a velocity less than the chain of the second section.

In accordance with one aspect of the invention, the transfer section includes a fixed saddle plate extending between the first binding line section exit end and the second binding line section entry end and an endless overhead chain having a plurality of spaced pusher pins. A belt drive system includes a timing belt and means operatively coupled to the first drive means and the overhead chain for driving the timing belt synchronously with the first and second binding line sections and including pulsing means for cyclically pulsing velocity of the overhead chain approximately between the velocities of the first and second binding line sections. Thus, when a signature is delivered to the saddle plate from the first binding line section transporting means, one of the pusher pins begins pushing the signature at a velocity similar to the velocity of the first binding line section transporting means and then rapidly varies velocity of the overhead chain so that when a signature is delivered to the second binding line section from the saddle plate, the pusher pin is pushing the signature at a velocity similar to the velocity of the second binding line section transporting means.

More particularly, there is disclosed a binding line comprising a gathering section including a gathering chain having a plurality of spaced pusher pins for transporting gathered signatures seriatim therealong to a signature exit end. A stitcher section includes a stitcher chain having a plurality of spaced pusher pins for transporting signatures seriatim therealong from a signature entry end. First drive means are provided for driving the gathering chain synchronously with the stitcher chain so that both the gathering section and stitcher section operate at a constant signature feed rate. The gathering chain pins are spaced apart a first select distance and the stitcher chain pins are spaced apart a second select distance, different from the first select distance. The first drive means drives the gathering chain at a different velocity from the stitcher chain to provide the constant signature feed rate. A transfer section includes a fixed saddle plate extending between the gathering section exit end and the stitcher section entry end and an endless overhead chain having a plurality of spaced pusher pins. A belt drive system includes a timing belt extending between a drive pulley and a driven pulley. The drive pulley is operatively coupled to the first drive means and the driven pulley is operatively coupled to the overhead chain. An idler pulley and cam mechanism are each operatively associated with the timing belt. The cam mechanism cyclically, reciprocally moves the idler pulley generally toward and away from a center line of the driven pulley to pulse velocity of the driven pulley, and thus the overhead chain, approximately between the velocities of the gathering section and the stitcher section so that when a signature is delivered to the saddle plate from the gathering chain, one of the pusher pins begins pushing a signature at a velocity similar to velocity of the gathering chain and then rapidly varies velocity of the overhead chain, so that when a signature is delivered to the stitcher section from the saddle plate, the pusher pin is pushing the signature at a velocity similar to velocity of the stitcher chain.

Further features and advantages of the invention will be apparent from the specification and from the drawing.

DETAILED DESCRIPTION OF THE INVENTION

Figure 1:
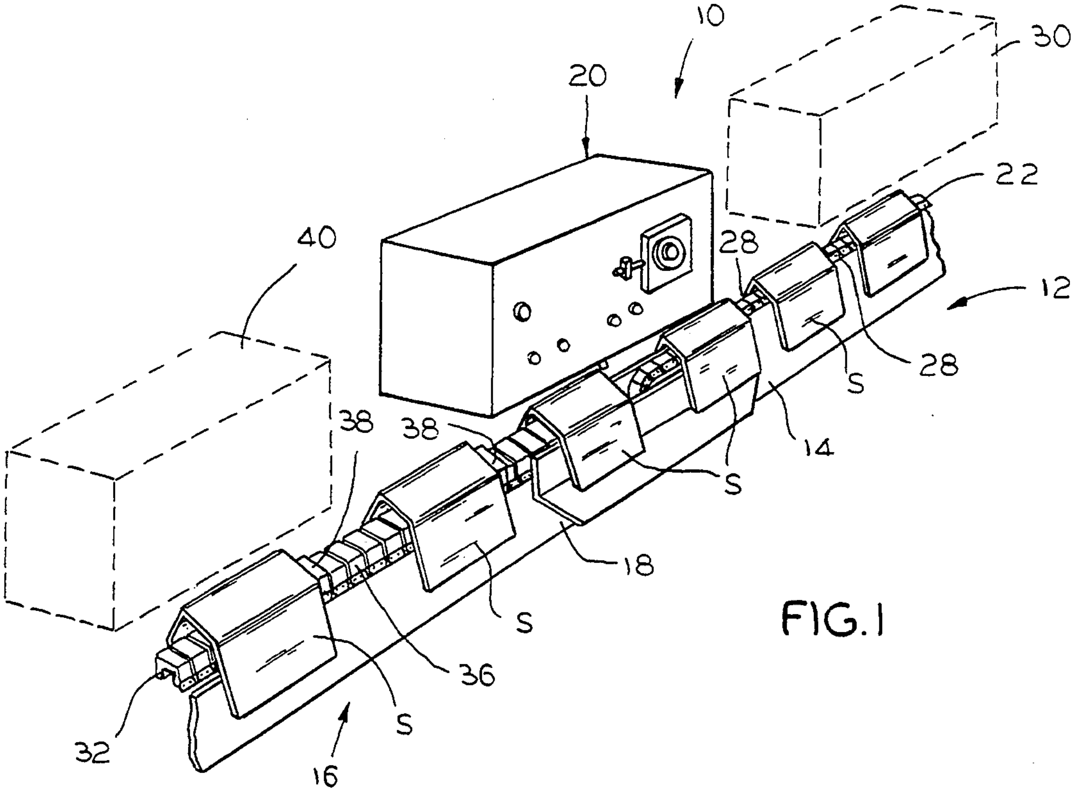
FIG. 1 is a perspective view showing relevant portions of a binding line according to the invention.

With reference to FIG. 1, a binding line 10 in accordance with the invention is illustrated. In its broadest concept, the binding line 10 comprises a first binding line section 12 for transporting signatures S seriatim therealong to a book exit end 14. A second binding line section 16 transports signatures S seriatim therealong to a book entry end 18. A transfer section 20 transfers signatures S seriatim from the first binding line section exit end 14 to the second binding line section entry end 18.

In accordance with the invention, the first and second binding line sections are synchronously driven so that both the first and second binding line sections 12 and 16 operate at a constant signature feed rate. As illustrated, the first binding line section 12 provides a different spacing between successive signatures S than does the second binding line section 16. Indeed, the first and second binding line sections 12 and 16 are driven at different velocities to provide the above mentioned constant feed rates.

The transfer section 20 is operated synchronously with the first and second binding line sections 12 and 16 and cyclically varies velocity of the transferring of signatures approximately between the velocities of the first binding line section 12 and second binding line section 16.

Figure 2:
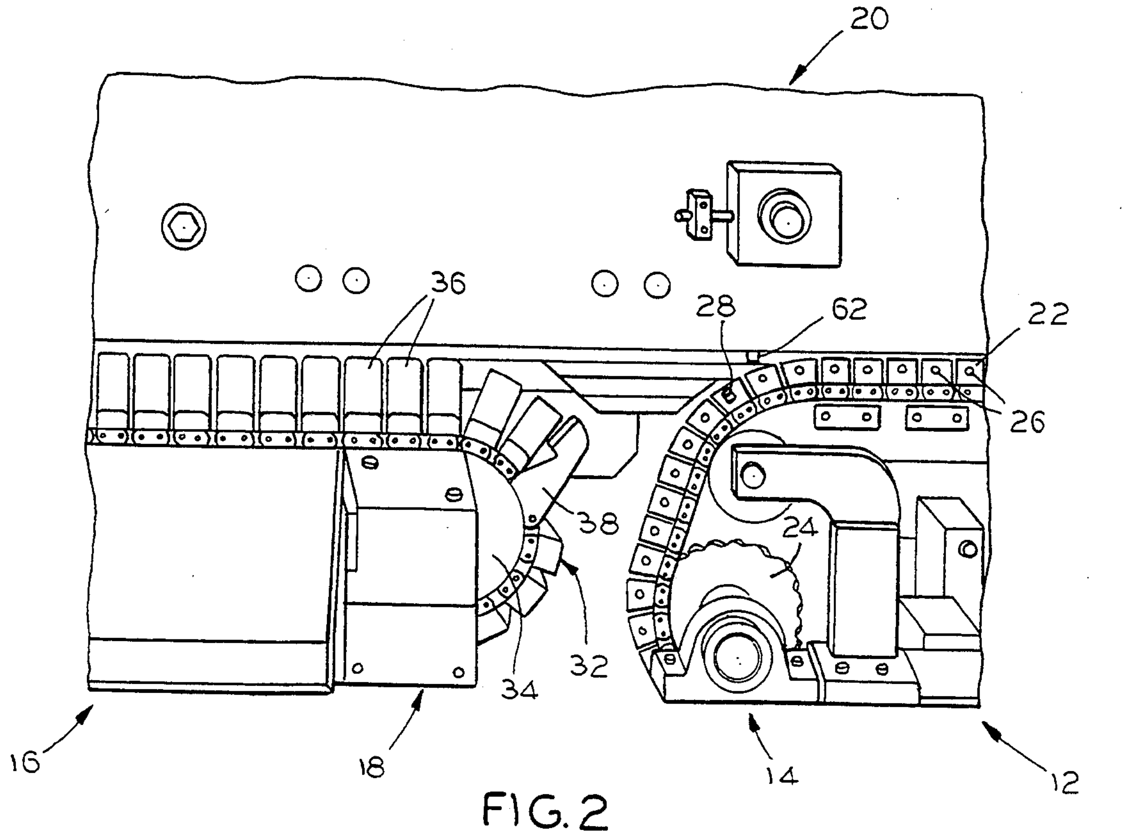
FIG. 2 is a detailed view of the binding line of FIG. 1 particularly illustrating an interface between a gathering chain, an overhead chain and a stitcher chain.

More particularly, the first binding line section 12 comprises a gathering section. Referring also to FIG. 2, the gathering section 12 includes an endless gathering chain 22 driven by a sprocket 24 at the exit end 14. In the illustrated embodiment, the gathering chain 22 includes a plurality of "links" 26 of any known form and spaced apart one inch. Various ones of the links 26 contain pusher pins 28 for bearing on the tail end of a signature S to transport it along the gathering section 12, as is well known.

In the illustrated embodiment of the invention, the pusher pins 28 are spaced a select distance of fifteen inches apart to provide a spacing of fifteen inches between tail ends of successive signatures S. However, the invention is not limited to a binding line 10 in which the select distance is fifteen inches, as will readily be apparent.

The gathering section 12 includes a plurality of signature feeders 30, only one of which is illustrated. Although not shown, each feeder 30 has a magazine for storing a plurality of signatures S, each signature being composed of one or more sheets folded along a center line. As the gathering chain 22 moves adjacent the signature feeder 30, the signature feeder drops a signature S so that it straddles the gathering chain 22 between two adjacent pusher pins 28. The pusher pins 28 bear against tail ends of the signatures as to advance them along the gathering section 12 to the exit end 14.

The second binding line section 16 comprises a stitcher section. The stitcher section 16 includes an endless stitcher chain 32 extending around an idler 34 at the entry end 18. The stitcher chain 32 also includes a plurality of three-quarter inch pitch chain "links" 36 approximately one and one-half inches apart. Selected one of the links 36 are ranged to define pusher pins 38. As above, the pusher pins 38 bear on a tail end of a signature S to transport it along the stitcher section 16. In the illustrated embodiment of the invention, the pusher pins 38 are spaced a fixed distance of twenty-one inches apart. With any such stitcher section 16 the pins 38 could be a different distance apart. However such distance is a fixed distance for a given machine.

A saddle stitcher 40 is operatively associated with the stitcher section 16 for binding the gathered signatures S. The stitcher 40 is a flying stitcher head type having stitcher heads and clinchers oscillating at a speed to match speed of books on the stitcher chain 32.

The particular form of the chains 22 and 32, and specifically the links 26 and 36 and associated pusher pins 28 and 38, is not critical to the claimed invention. These elements are instead selected to satisfy other binding line requirements, as should tie apparent to those skilled in the art.

In a synchronously operated binding line, both the gathering section 12 and stitcher section 16 operate to provide constant book feed rate. Conventionally, this is accomplished by operating the gathering chain 22 at the same speed as the stitcher chain 32 using identical pin spacing for each. In a binding line, larger pin spacing, on the order of twenty-one inches, is sometimes required. However, productivity improvements are believed to exist by shortening pin spacing to minimize impact between the pin and the signatures. As shown in the illustrated embodiment, the stitching section 16 uses fixed twenty-one inch spacing to satisfy operating requirements. In accordance with the invention, the gathering section 12 is capable of operation at a matched twenty-one inch spacing or a considerably shorter spacing to enable higher productivity. The illustrated gathering section 12 uses fifteen inch spacing to significantly improve productivity, i.e., number of acceptable signatures produced. Needless to say, the invention is not limited to the described twenty-one inch and fifteen inch pin spacing. Instead, the inventive concept can be used in connection with a gathering section 12 and stitcher section 16 using different pin spacing but operating synchronously at constant feed rates.

Figure 3:
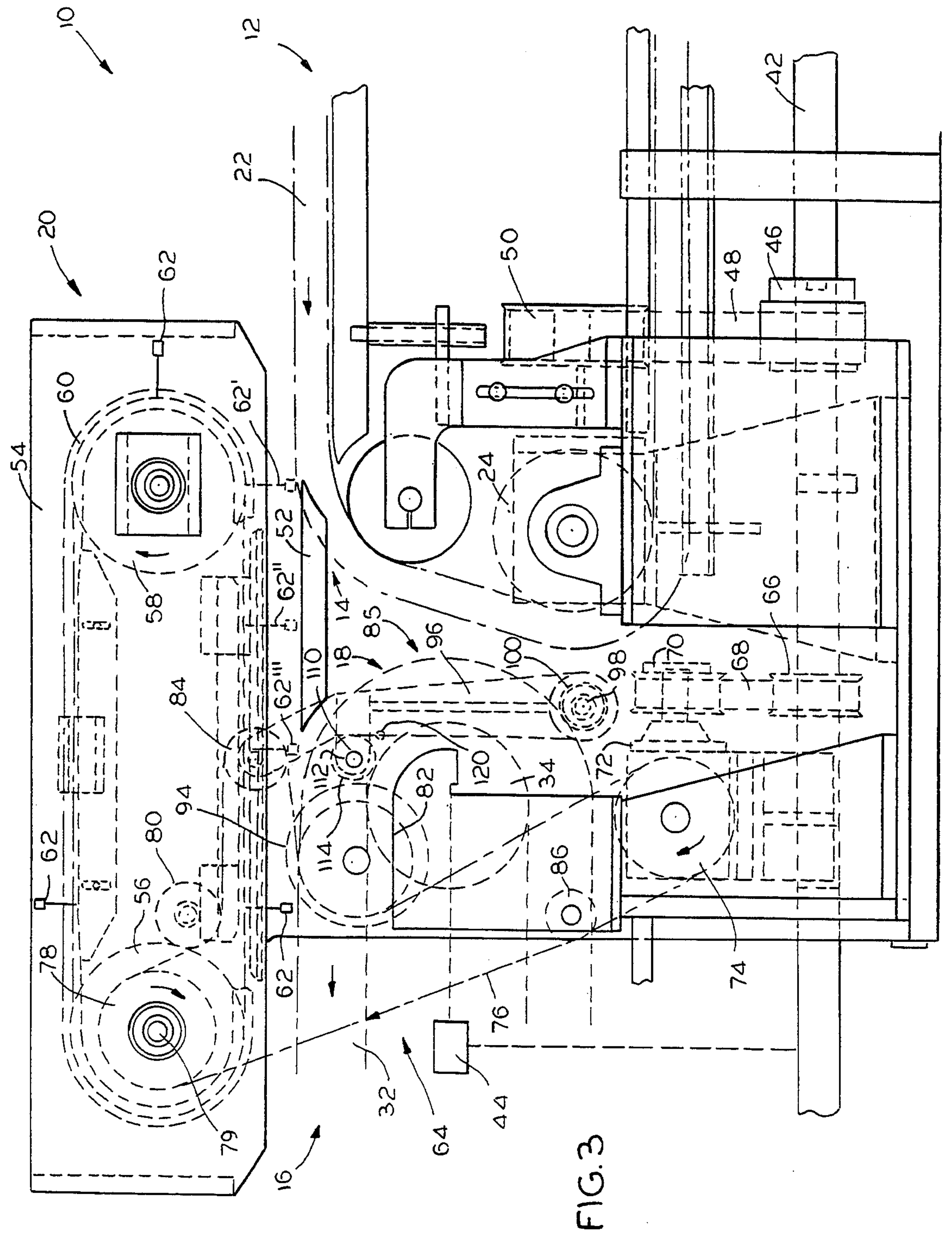
FIG. 3 is a combined detail and schematic view illustrating the drive mechanism for the binding line of FIG. 1.
Figure 4:
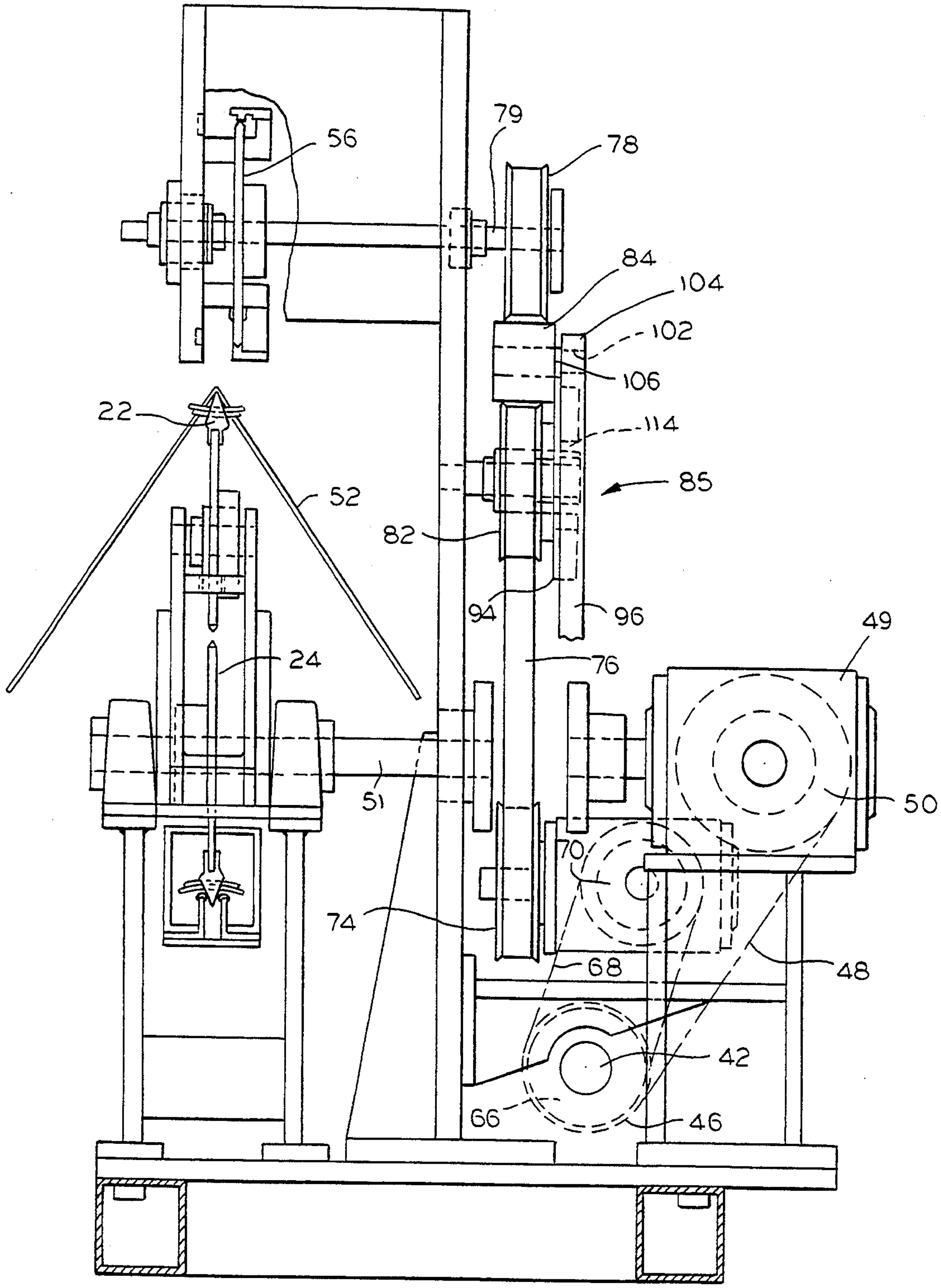
FIG. 4 is a side view showing portions of the binding line of FIG. 1.

With reference to FIGS. 3 and 4, the binding line 10 includes an elongate main drive shaft 42 driven at a constant desired speed by a suitable motive source (not shown). The drive shaft 42 is connected via a drive, illustrated schematically at 44, for driving the stitcher chain 32 about the stitcher section idler 34. The drive 44 is configured to provide a one-to-one ratio between the main drive shaft 42 and the idler 34. The idler 34 is twenty-one inches in circumference so that for one revolution of the drive shaft 42, the idler 34 rotates to advance the stitcher chain 32 twenty-one inches per cycle.

For driving the gathering section 12, a drive pulley 46 is operatively driven by the main shaft 42. The drive pulley 46 comprises a forty tooth pulley. A timing belt 48 extends around the drive pulley 46 and a driven pulley 50. The driven pulley 50 has fifty-six teeth to provide a 1.4:1 ratio between the drive pulley 46 and the driven pulley 50. The driven pulley 50 is operatively connected via a gear box 49 and shaft 51 to the sprocket 24 at a 1:1 ratio. The sprocket 24 also has a twenty-one inch circumference. However, because of the 1.4:1 ratio between the drive pulley 46 and driven pulley 50, the sprocket 24 rotates fifteen inches per cycle. Thus, the gathering chain 24 is driven at a rate of fifteen inches per cycle, corresponding to the fifteen inch spacing between pins 28, while the stitcher chain 32 is driven at a velocity of twenty-one inches per cycle, corresponding to the twenty-one inch spacing between pusher pins 38.

The transfer section 20 is operable to transfer signatures from the gathering chain 22 to the stitcher chain 32. The transfer section 20 includes a fixed saddle plate 52 extending between the gathering chain 22 and stitcher chain 32. Particularly, as signatures are delivered along the gathering chain 22 to the exit end 14, the signatures straddle the saddle plate 52, and as they are further transported along the transfer section 20, they then straddle the stitcher chain 32 to be transported therealong.

Positioned above the saddle plate 52 is a transfer assembly 54 including a drive sprocket 56 and a driven sprocket 58. Each sprocket 56 and 58 is twenty-one inches in circumference with respective axes spaced twenty-one inches apart. An endless link chain, referred to as an overhead chain 60, extends around the drive sprocket 56 and driven sprocket 58. Mounted at twenty-one inch intervals along the chain 60 are a plurality of pusher pins 62, shown in solid line. (Three pusher pins 62 are also shown in dotted line to illustrate various positions of one of the pusher pins 62 during a cycle of operation as described in detail below.) The particular positions of the pusher pins 62 as shown in solid line are selected to correspond to positions of the gathering chain pusher pins 28 and the stitcher chain pusher pins 38 for transporting a signature from the gathering section exit end 14 to the stitcher section entry end 18. In accordance with the invention, the overhead chain 60 is pulsed to smoothly pick up a signature at a speed similar to the fifteen inch per cycle from the gathering chain 22 and deliver the signature at a speed similar to the twenty-one inch per cycle velocity of the stitcher chain 32.

The transfer system 54 is driven by a belt drive system 64. The belt drive system 64 includes a drive pulley 66 directly driven by the main shaft 42 and connected via a timing belt 68 to a driven pulley 70. The drive pulley 66 and driven pulley 70 are operated at a 1:1 ratio. The driven pulley 70 is associated with a gear mechanism 72 having an output drive shaft 74. The output drive shaft 74 is connected via a two sided timing belt 76 to a driven pulley 78. The drive pulley 74 and driven pulley 78 are configured to provide a 1:1 ratio. As seen in FIG. 4, the driven pulley 78 is connected via a shaft 79 to the overhead drive sprocket 56. The timing belt 76 also extends between a fixed idler pulley 80 and a cam mounting timing pulley 82 and then around a lever arm idler pulley 84. The timing pulley 82 and idler pulley 84 are associated with a cam mechanism 85, discussed below. A spring loaded belt tensioning pulley 86 is disposed between the drive pulley 74 and driven pulley 78.

Figure 6:
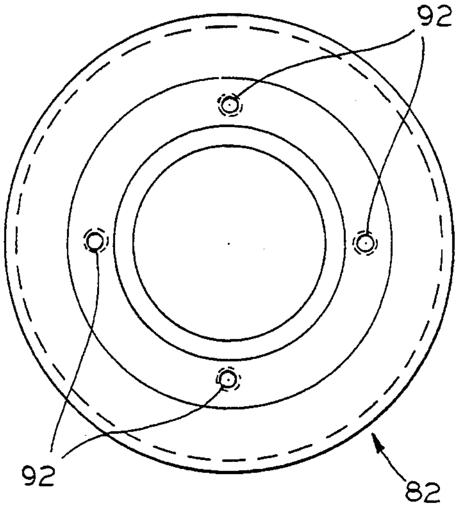
FIG. 6 is a front view taken along a line 6—6 of FIG. 5.
Figure 5:
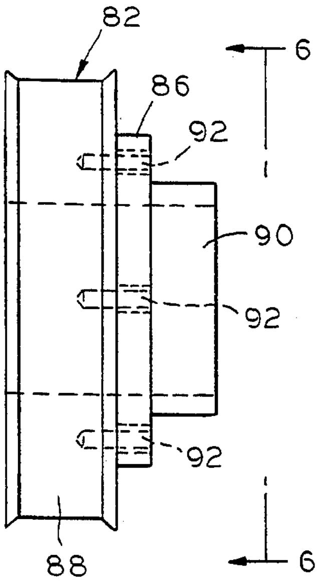
FIG. 5 is a side view of a cam mounting timing pulley for the binding line of FIG. 1.
Figure 7:
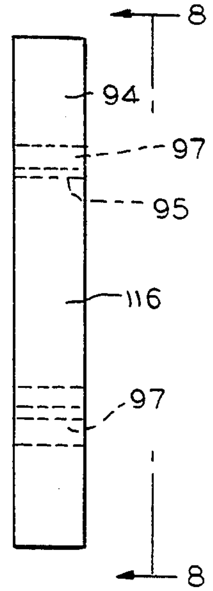
FIG. 7 is a side view of a cam associated with the pulley of FIG. 5.

With reference to FIGS. 5 and 6, the cam mounting timing pulley 82 comprises a conventional timing pulley 88 having a hub 86 machined to provide a smaller hub section 90. Four threaded openings 92 are provided through the hub 86 about the hub section 90 and spaced approximately 90° apart. A cam 94 includes a central opening 95 receiving the smaller hub section 90. The threaded openings 92 receive threaded fasteners (not shown) which also pass through corresponding cam openings 97 similarly spaced for securing the cam 94, see FIGS. 7 and 8, to the cam mounting timing pulley 82. Thus, the cam 94 is directly driven by the pulley 82 for rotation therewith.

Figure 9:
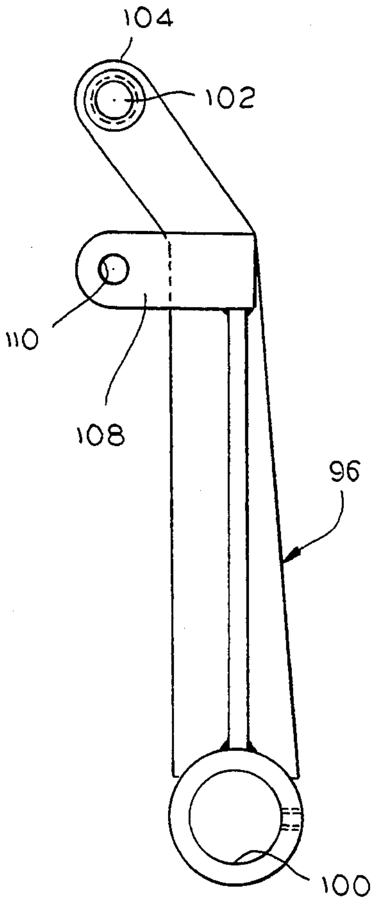
FIG. 9 is a front view of a cam lever arm associated with the cam of FIG. 7.

With reference also to FIG. 9, a lever arm 96 is operatively associated with the cam 94. The lever arm 96 is pivotally mounted to the transfer section 20 as by a shaft 98 being received in a hub 100, see FIGS. 3 and 9. The lever arm 96 includes an opening 102 at a distal end 104 carrying a shaft 106 mounted to the idler pulley 84, see FIG. 4. Located below the distal end 104 is a generally perpendicular side arm 108 having a through opening 110. A shaft 112 mounts a roller 114 in the opening 110. The roller 114 bears on an outer circumferential surface 116 of the cam 94.

Figure 8:
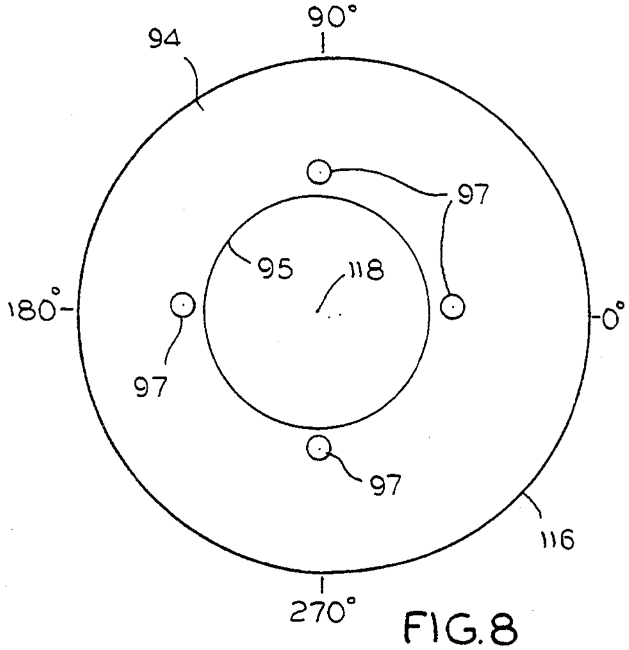
FIG. 8 is a front view taken along the line 8—8 of FIG. 7.

During operation, the belt system timing belt 76 is driven by the drive pulley 74 to drive the overhead chain 60 via the driven pulley 78 and drive sprocket 56. The cam mounting timing pulley 82 is driven at a 1:1 ratio with the drive pulley 74. Thus, the cam mounted timing pulley 82 and the cam 94 rotate one complete revolution during each operating cycle. The cam outer circumferential surface 116 is non-circular. The timing belt 76 surrounding the lever arm idler pulley 84 draws the lever arm 96 toward the cam 94 with the roller 114 bearing on the cam outer surface 116. As the cam 94 rotates, the roller 114 is reciprocally moved so that the lever arm idler pulley 84 is reciprocally moved generally toward and away from a center line of the driven pulley 78 to pulse velocity of the driven pulley 78 and thus the overhead chain 60. Particularly, as the lever arm idler puller 84 moves away, to the right as illustrated in FIG. 3, the speed of the driven pulley 78 increases. Conversely, when the lever arm idler puller 84 is moved toward the center line, i.e., to the left in FIG. 3, the driven pulley 78 slows down so that the overhead chain 60 moves at a slower velocity. In accordance with the invention, the dimensions of the cams 94 are selected so that the overhead chain 60 moves at an average velocity of twenty-one inches per cycle to match the speed of the stitcher chain 32, but is pulsed approximately between the velocity of the gathering chain 22 and the stitcher chain 32. With reference to FIG. 8, the cam 94 is marked to identify radial positions labeled 0°, 90°, 180° and 270°. The following chart illustrates the radius from an axis 118 to the outer surface 116 in 10° radial increments. The chart also illustrates velocity of the overhead chain 60 produced by such portion of the cam 94 acting on the lever arm 96 via the roller 114.

| DEGREES | RADIUS IN INCHES | VELOCITY IN INCHES/CYCLE |
|---|---|---|
| 0 | 3.000 | 21 |
| 10 | 2.993 | 20.5 |
| 20 | 2.973 | 20 |
| 30 | 2.958 | 19 |
| 40 | 2.932 | 18 |
| 50 | 2.897 | 17.5 |
| 60 | 2.850 | 17 |
| 70 | 2.804 | 16.5 |
| 80 | 2.760 | 16.5 |
| 90 | 2.710 | 16.5 |
| 100 | 2.669 | 17 |
| 110 | 2.637 | 17.5 |
| 120 | 2.612 | 18 |
| 130 | 2.593 | 19 |
| 140 | 2.585 | 20 |
| 150 | 2.595 | 21 |
| 160 | 2.615 | 22 |
| 170 | 2.632 | 23 |
| 180 | 2.655 | 23.5 |
| 190 | 2.680 | 23.5 |
| 200 | 2.700 | 23.5 |
| 210 | 2.725 | 23.5 |
| 220 | 2.746 | 23.5 |
| 230 | 2.767 | 23.5 |
| 240 | 2.789 | 23.5 |
| 250 | 2.811 | 23.5 |
| 260 | 2.833 | 23.5 |
| 270 | 2.858 | 23.5 |
| 280 | 2.885 | 23.5 |
| 290 | 2.910 | 23.5 |
| 300 | 2.937 | 23.5 |
| 310 | 2.955 | 23 |
| 320 | 2.975 | 22.5 |
| 330 | 2.985 | 22 |
| 340 | 2.993 | 21.5 |
| 350 | 2.997 | 21.2 |

FIG. 3 illustrates the transfer section 20 at a zero or reference position. Particularly, the cam 94 is at a zero reference position, i.e, the zero degree radial position of the cam 94 is in contact with the roller 114. This zero degree position corresponds to one of the overhead chain pusher pins 62 being at approximately a three o'clock position of the driven sprocket 58, as viewed in FIG. 3. With reference to the above chart, this corresponds to the overhead chain 60 being driven at a twenty-one inch per cycle speed. At the 90° position, as illustrated by the pin 62' in dash lines, corresponding to the approximate position at which the pusher pins 62 begin pushing a signature delivered from the gathering chain 22, the pusher pin 62 has slowed to approximately sixteen and one-half inches/cycle, which is similar to the fifteen inch per cycle speed of the gathering chain 22. At the 180° position, as illustrated by the pusher pin 62'', shown in dash lines, the pusher pin 62 has accelerated to its maximum speed of twenty-three and one-half inches/cycle which is maintained through a 270° position illustrated with the pusher pin 62''', shown in dash lines. At approximately the 360° position, represented by the position of another pusher pin 62 as shown, the overhead chain will be moving at a velocity of twenty-one inches per cycle identical to that of the stitcher chain 32. As that pusher pin subsequently slows down, the pusher pin 38 of the stitcher chain 32 will take over so that the transfer has been completed. The next pusher pin 62 at that time will be advancing in position to transfer the next successive signature to be delivered.

The speed of the stitcher chain 32 is fixed for any given stitcher section 16. As will be apparent, the relative speeds of the gathering chain 22 and stitcher chain 32, can be selected to be of various different ratios by changing the ratio between the gathering section drive pulley 46 and driven pulley 50. In so doing, the cam 94 must be modified to provide the select pulsing according to the particular speeds involved.

If necessary to gather signatures requiring a gathering chain space greater than fifteen inches, then in its most basic form the gathering section 12 would be modified by utilizing twenty-one inch pin spacing similar to the stitcher section 16. To do so, the driven pulley 50 would be replaced with a forty tooth pulley to provide 1:1 ratio and the lever arm 96 is locked in position with a screw 120 with the arm 96 spaced from the cam 94 so that a constant speed is maintained by the overhead chain 60 at twenty-one inches per cycle.

Thus, in accordance with the invention, a binding line system is provided in which a stitcher chain is uniformly operated at a fixed, relatively large chain spacing, while the gathering chain is selectively operated with a smaller chain spacing to improve productivity, while the two are driven synchronously with a transfer system which starts at a relatively slow speed corresponding to speed of the gathering chain and accelerates to a speed similar to that of the stitcher chain, with an average speed corresponding to that of the stitcher chain. Thus, the gathering chain 22 is slowed down to improve productivity without decreasing throughput.

We claim:

1. A binding line comprising:
- a first binding line section including means for transporting signatures seriatim therealong to a book exit end;
- a second binding line section including means for transporting signatures seriatim therealong from a book entry end;
- first drive means for driving said first binding line section synchronously with said second binding line section so that both said first and second binding line sections operate at a constant signature feed rate;
- said first binding line section providing a different spacing between successive signatures than said second binding line section so that said drive means drives said first binding line section at a different velocity from said second binding line section;
- a transfer section including means for transferring signatures seriatim from the first binding line section exit end to the second binding line section entry end; and
- second drive means operatively coupled to said first drive means and said transfer section for driving said transferring means synchronously with said first and second binding line sections and including means for cyclically varying velocity of said transferring means approximately between the velocities of said first and second binding line sections.

2. The binding line of claim 1 wherein said first drive means drives said first binding line section at a slower velocity than said second binding line section and said second drive means varies velocity of said transferring means during a signature transfer cycle from a relatively slow speed to a relatively high speed.

3. The binding line of claim 1 wherein said second drive means comprises a belt drive, the speed of the belt being varied synchronously with said first drive means.

4. The binding line of claim 1 wherein said second drive means drives said transferring means at an average velocity substantially equal to velocity of said second binding line section.

5. The binding line of claim 1 wherein each said first and second binding line section comprises a driven chain having pins spaced a select distance apart to determine spacing between successive signatures transported therealong.

6. The binding line of claim 5 wherein said select distance for said first binding line section is less than said select distance for said second binding line section.

7. The binding line of claim 6 wherein said first drive means drives the chain of said first section at a velocity less than the chain of said second section.

8. A binding line comprising:
- a first binding line section including means for transporting signatures seriatim therealong to a signature exit end;
- a second binding line section including means for transporting signatures seriatim therealong from a signature entry end;
- first drive means for driving said first binding line section synchronously with said second binding line section so that both said first and second binding line sections operate at a constant signature feed rate;
- said first binding line section providing a different spacing between tail ends of successive signatures than said second binding line section so that said drive means drives said first and second binding line sections at different velocities;
- a transfer section including a fixed saddle plate extending between said first binding line section exit end and said second binding line section entry end and an endless overhead chain having a plurality of spaced pusher pins; and
- a belt drive system including a timing belt and means operatively coupled to said first drive means and said overhead chain for driving said timing belt synchronously with said first and second binding line sections and including pulsing means for cyclically pulsing velocity of said overhead chain approximately between the velocities of said first and second binding line sections, so that when a signature is delivered to said saddle plate from said first binding line section transporting means one of said pusher pins begins pushing the signature at a velocity similar to velocity of the first binding line section transporting means and then rapidly varies velocity of the overhead chain so that when a signature is delivered to said second biding line section from said saddle plate said pusher pin is pushing the signature at a velocity similar to velocity of the second binding line section transporting means.

9. The binding line of claim 8 wherein said first drive means drives said first binding line section at a slower velocity than said second binding line section and said second drive means varies velocity of said overhead chain during a signature transfer cycle from a relatively slow speed to a relatively high speed.

10. The binding line of claim 8 wherein said second drive means drives said overhead chain at an average velocity substantially equal to velocity of said second binding line section.

11. The binding line of claim 8 wherein each said first and second binding line section comprises a driven chain having pins spaced a select distance apart to determine spacing between successive signatures transported therealong.

12. The binding line of claim 11 wherein said select distance for said first binding line section is less than said select distance for said second binding line section.

13. The binding line of claim 12 wherein said first drive means drives the chain of said first section at a velocity less than the chain of said second section.

14. A binding line comprising:

a gathering section including a gathering chain having a plurality of spaced pusher pins for transporting gathered signatures seriatim therealong to a signature exit end;

a stitcher section including a stitcher chain having a plurality of spaced pusher pins for transporting signatures seriatim therealong from a signature entry end;

first drive means for driving said gathering chain synchronously with said stitcher chain so that both said gathering section and stitcher section operate at a constant signature feed rate;

said gathering chain pins being spaced apart a first select distance and the stitcher chain pins being spaced apart a second select distance, different from the first select distance, said drive means driving said gathering chain at a different velocity from the stitcher chain to provide said constant signature feed rate;

a transfer section including a fixed saddle plate extending between said gathering section exit end and said stitcher section entry end and an endless overhead chain having a plurality of spaced pusher pins; and a belt drive system including a timing belt extending between a drive pulley and a driven pulley, said drive pulley being operatively coupled to said first drive means and said driven pulley being operatively coupled to said overhead chain, for driving said timing belt synchronously with said gathering section and said stitcher section and further including an idler pulley and a cam mechanism each operatively associated with said timing belt, said cam mechanism cyclically, reciprocally moving said idler pulley generally toward and away from a centerline of said driven pulley to pulse velocity of said driven pulley and thus said overhead chain approximately between the velocities of said gathering section and said stitcher section, so that when a signature is delivered to said saddle plate from said gathering chain one of said pusher pins begins pushing the signature at a velocity similar to velocity of the gathering chain and then rapidly varies velocity of the overhead chain so that when a signature is delivered to said stitcher section from said saddle plate said pusher pin is pushing the signature at a velocity similar to velocity of the stitcher chain.

15. The binding line of claim 14 wherein said first drive means drives said gathering chain at a slower velocity than said stitcher chain and said second drive means varies velocity of said overhead chain during a signature transfer cycle from a relatively slow speed to a relatively high speed.

16. The binding line of claim 14 wherein said second drive means drives said overhead chain at an average velocity substantially equal to velocity of said stitcher chain.

17. The binding line of claim 14 wherein said first select distance is less than said second select distance.

18. The binding line of claim 17 wherein said first drive means drives the gathering chain at a velocity less than the stitcher chain.

19. The binding line of claim 14 wherein said first drive means comprises a pulley drive including a drive pulley and a driven pulley and a ratio of the drive pulley to the driven pulley is selected to provide a desired velocity ratio of said gathering chain relative to said stitcher chain and said cam mechanism includes a cam having a cam surface selected to vary velocity of said overhead chain according to said chain velocities.

20. The binding line of claim 19 wherein said pulley ratio can be selected to provide a one-to-one speed ratio with said cam mechanism being locked so that said overhead chain is operated at a constant speed.

* * * * *